May 26, 1931.  T. W. BELL ET AL  1,806,733
LINK
Filed June 29, 1928
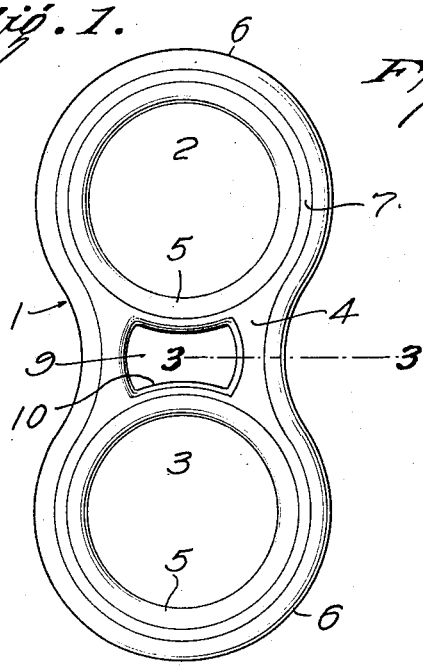
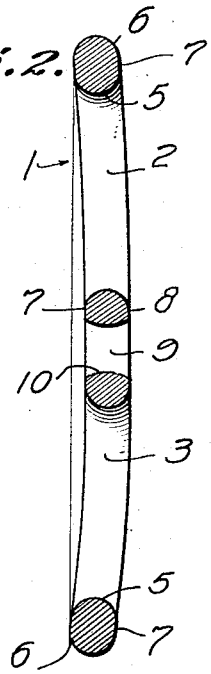
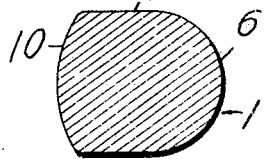
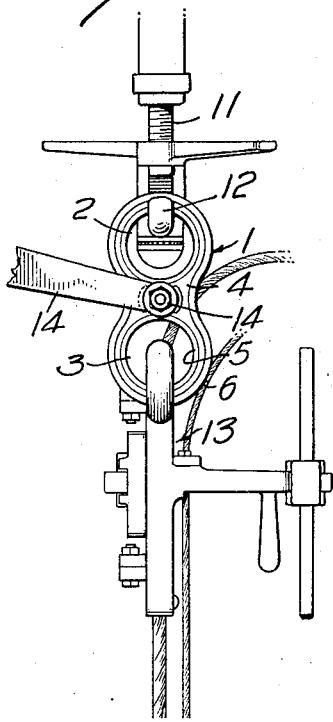
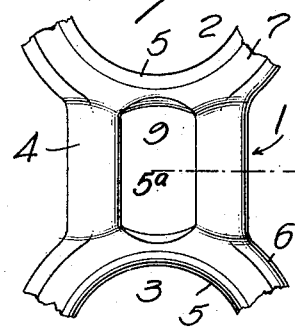
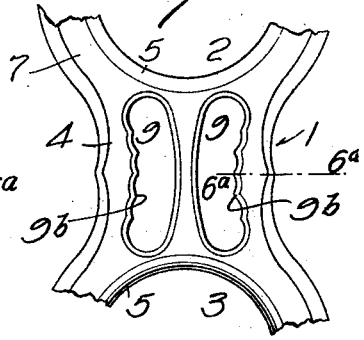
Inventors
THOMAS W. BELL,
THOMAS C. ROGERS,
By Spear Middleton Donaldson Hall
Attorneys Patented May 26, 1931

1,806,733

UNITED STATES PATENT OFFICE

THOMAS W. BELL AND THOMAS C. ROGERS, OF PARKERSBURG, WEST VIRGINIA, ASSIGNORS TO ACME FISHING TOOL CO., OF PARKERSBURG, WEST VIRGINIA, A CORPORATION OF WEST VIRGINIA

LINK

Application filed June 29, 1928. Serial No. 289,318.

This invention relates to a link such as is used in connection with the drilling of oil wells. As commonly used it is the practice to suspend a wire line drilling clamp from the temper screw by means of two links, and this present invention has for its object the provision of a link for the above purpose which will be of maximum efficiency considering all the peculiar requirements attendant such use.

To this end the invention contemplates a link of the above type which is of substantially a figure 8 configuration, each of the eyes therein being circular, the central joining portion being perforated.

In order to provide a link of maximum strength with minimum weight, we prefer to form the same by dropping forging although this is not essential, and use a sectional contour as shown.

The entire outer edge or face of the link is arc shaped in cross section as is also the inner face of the end eyes, and the radii of these two arcs are the same. The front and rear faces of the link are flattened. The face of the link surrounding the central aperture is also arc shaped in cross section but on a radius different and preferably greater than the radius of the link outer face. The entire link is dished or of a convex form to provide maximum room for working parts between links in use, and to form a hand hold for the operator.

The invention further consists in the novel arrangement, combination, and proportion of parts more fully described hereinafter and shown in the drawings, in which:

Figure 1 is an elevation of a link embodying our invention.

Fig. 2 is a sectional elevation of the link of Fig. 1.

Fig. 3 is a sectional view along the line 3—3.

Fig. 4 is a diagrammatic showing of the link in use

Fig. 5 is a fragmentary elevation of a modified link.

Fig. 5a is a sectional view along the line 5a—5a of Fig. 5.

Fig. 6 is a view similar to Fig. 5 but of another form of link.

Fig. 6a is a sectional view along the line 6a—6a of Fig. 6.

In the drawings we have shown a link indicated generally at 1 having end eyes 2 and 3 and a central joined portion 4, thus giving to the device a figure 8 appearance.

Each eye is provided with an inner face 5 and an outer face 6, arc-shaped in cross section, and on the same radius as shown in Fig. 2.

The entire link is substantially flattened in its front face 7 and rear face 8 to lighten the link and save unnecessary material. The entire link is slightly dished or convex so that this flattening is not strictly a plane, although approximately so.

The central joined portion 4 is provided with an aperture 9, the inner face 10 of which is arc-shaped in cross section, on a radius different from and slightly greater than that of the eyes 2 and 3.

This aperture may be of any desired configuration, as shown in the links of other figures.

In order to more readily adapt that portion of the link adjacent the central aperture to a hand hold, we may provide configurations as shown in Figs. 5 and 6.

In the former, the hand hold is constituted by the substantially cylindrical portion 4.

In Fig. 6, two apertures 9 are provided, which, however, do not interfere with the use of either. In this form, the hand holds are grooved as at 9b.

In use, and with reference to Fig. 4, the temper screw is shown generally at 11 having a horizontal arm 12 from each end of which is hung a link 1. The dished face of each link faces the temper screw which gives more room for manipulation of the lines and the like by workmen.

The top of the wire line clamp is shown at 13 hung from the bottom eye 3 of the links.

In practice, the temper screw is attached to means whereby the entire string of tools carried by the clamp may be reciprocated in the hole.

It is desirable and ofttimes necessary to provide means to prevent the clamp and associated parts from oscillating due to the twisting and untwisting of the tool cable. For this purpose a jockey stick is provided shown generally at 14 attached at one end, for hinging movement to a headache post and at the other to one of the links.

This latter attachment is made by passing a bolt 16 through jockey stick 14 and central aperture 9 securing the stick and link together. Obviously this connection is to be made so that slight pivotal movement may be had between stick and link.

The configuration of the link is such that fouling or kinking will be prevented when the entire string of tools and mechanism is reciprocated or when tension on the line is suddenly released as is frequently done.

The cross sectional configuration assures maximum strength with minimum amount of metal.

We claim:

1. A link for wire line clamps having two end eyes and a central aperture between the eyes, the metal of the link contained between the aperture wall and the outer surface of the link being of elongated bar configuration to afford a hand hold.

2. A link for wire line clamps used for well drilling having two end eyes joined together by two elongated spaced apart bars shaped to afford a hand hold.

3. A link used in well drilling having an eye at each end thereof, and an elongated bar hand hold between the eyes.

4. A link used in well drilling having an eye at each end thereof, and an elongated bar hand hold extending from one eye to the other.

In testimony whereof, we affix our signatures.

THOS. W. BELL.
THOS. C. ROGERS.